United States Patent
DeSalvo

(10) Patent No.: US 7,117,210 B2
(45) Date of Patent: Oct. 3, 2006

(54) SYSTEM AND METHOD OF DISTRIBUTING A FILE BY EMAIL

(75) Inventor: Christopher J. DeSalvo, San Francisco, CA (US)

(73) Assignee: Danger, Inc., Palo Alto, CA (US)

( * ) Notice: Subject to any disclaimer, the term of this patent is extended or adjusted under 35 U.S.C. 154(b) by 224 days.

(21) Appl. No.: 09/952,419

(22) Filed: Sep. 13, 2001

(65) Prior Publication Data

US 2003/0050933 A1 Mar. 13, 2003

Related U.S. Application Data

(60) Provisional application No. 60/317,772, filed on Sep. 6, 2001.

(51) Int. Cl.
- G06F 7/00 (2006.01)
- G06F 17/00 (2006.01)
- G06F 17/30 (2006.01)
- G06F 12/00 (2006.01)
- G06F 15/16 (2006.01)

(52) U.S. Cl. .................. 707/10; 707/102; 707/200; 709/203; 709/206

(58) Field of Classification Search .............. 707/9, 707/10, 102, 200; 709/200, 203, 206, 227, 709/232
See application file for complete search history.

(56) References Cited

U.S. PATENT DOCUMENTS

| | | | |
|---|---|---|---|
| 5,764,899 A | | 6/1998 | Eggleston et al. |
| 5,781,901 A | * | 7/1998 | Kuzma .................. 707/10 |
| 5,818,447 A | * | 10/1998 | Wolf et al. ............. 715/752 |
| 5,903,723 A | * | 5/1999 | Beck et al. ............. 709/200 |
| 5,974,449 A | * | 10/1999 | Chang et al. ........... 709/206 |
| 6,023,700 A | * | 2/2000 | Owens et al. ........... 707/10 |
| 6,092,114 A | * | 7/2000 | Shaffer et al. .......... 709/232 |
| 6,101,320 A | * | 8/2000 | Schuetze et al. ........ 709/206 |
| 6,256,666 B1 | | 7/2001 | Singhal |

(Continued)

FOREIGN PATENT DOCUMENTS

WO WO 02/13031 A1 2/2002

OTHER PUBLICATIONS

Ruth Willson and Tim Rudolph (2000), From the techies . . . , pp. 1-3.*

(Continued)

*Primary Examiner*—Don Wong
*Assistant Examiner*—Merilyn Nguyen
(74) *Attorney, Agent, or Firm*—Blakely, Sokoloff, Taylor & Zafman, LLP

(57) ABSTRACT

A system and method of distributing a file by email is described: receiving a first email in a server, wherein the first email includes a first attachment; storing the first attachment on the server; converting the first attachment to create a converted attachment; outputting the first email to an addressee, wherein the first email includes the converted attachment and further wherein the first email is received in a client comprising the addressee; receiving a forward email message in the server from the addressee, the forward email message containing the converted attachment and a forward addressee; identifying the first attachment in response to receiving the forward email message, wherein identifying the first attachment comprises using an attachment identifier to identify the first attachment from a plurality of stored attachments, wherein the attachment identifier includes the converted attachment; attaching the first attachment to the forward email message; and forwarding the forward email with the first attachment to the forward addressee.

16 Claims, 10 Drawing Sheets

U.S. PATENT DOCUMENTS

| | | |
|---|---|---|
| 6,275,848 B1 | 8/2001 | Arnold |
| 6,360,252 B1 | 3/2002 | Rudy |
| 6,505,237 B1 | 1/2003 | Beyda et al. |
| 6,546,417 B1 | 4/2003 | Baker |
| 6,598,076 B1* | 7/2003 | Chang et al. ............... 709/206 |
| 6,839,741 B1* | 1/2005 | Tsai ........................... 709/217 |
| 2002/0016818 A1* | 2/2002 | Kirani et al. ............... 709/203 |
| 2002/0019851 A1* | 2/2002 | Pollack ....................... 709/206 |
| 2002/0035576 A1 | 3/2002 | Kishimoto et al. |
| 2002/0059384 A1* | 5/2002 | Kaars ......................... 709/206 |
| 2002/0120693 A1* | 8/2002 | Rudd et al. ................. 709/206 |
| 2003/0028647 A1* | 2/2003 | Grosu ......................... 709/227 |
| 2003/0050933 A1 | 3/2003 | DeSalvo |
| 2003/0065926 A1* | 4/2003 | Schultz et al. .............. 713/188 |
| 2003/0093565 A1 | 5/2003 | Berger et al. |
| 2003/0095559 A1 | 5/2003 | Lewis et al. |
| 2003/0126214 A1 | 7/2003 | Oliszewski |

OTHER PUBLICATIONS

John F. Meech, Katherine Baker, Edith Law, Ramiro Liscano (2000), A Multi-Agent System for Personal Messaging, pp. 144-145.*

Arturo Pizano and Tai-Yuan Hou (1996),Integrated Multimedia Messaging Concepts and Applications, pp. 12-16.*

Office Action for Related Case U.S. Appl. No. 10/138,207 filed on May 2, 2002; 13 pgs.

Current claims for Related Case U.S. Appl. No. 10/138,207 filed on May 2, 2002; 10 pgs.

* cited by examiner

SYSTEM AND METHOD OF DISTRIBUTING A FILE BY EMAIL

The present application claims priority from a U.S. provisional application entitled "A System and Method of Distributing a File by Email", Application No. 60/317,772, filed Sep. 6, 2001.

FIELD OF THE INVENTION

The present invention relates to email systems and more specifically to an improved system and method of distributing file attachments by email.

BACKGROUND OF THE INVENTION

Electronic mail (email) is used by many people. Often an email includes a file attachment (attachment) so that the attachment can be distributed to the addressees/recipients of the email. Attachments can include any type of file such as data, computer applications, graphics, text documents, and other files. Typically, an attachment is distributed to one or more persons or computers. The attachment can be viewed or otherwise used by the recipients of the email. Email is a preferred method of distributing attachments that more than one person needs access to.

The recipients can also reply to or forward the email and can opt to include the attachment as part of the replying or forwarding function. Forwarding the email includes creating a new email that includes the contents of the original email to additional addressees/recipients. The forwarding party (i.e. the recipient of the original email) can also edit the email. Replying to the email includes forwarding the email to one or more of the other addresses and/or the sender of the email.

FIG. 1 illustrates a typical email. The email includes an addressee's email address "jim.smith@kookoo.com" in the addressee field 104, a carbon copy (CC) addressee's email address "jim.jones@anycompany.com" in the carbon copy (CC) addressee's field 106, the author/sender's email address "jane.doe@kookoo.com", in the author/sender's field 102. The addressees and CC addressees are often referred to generally as the addressees. The email can also include other types of addressees. The email also includes a message window 110 that shows a message 111 from the author to the addressees and a signature block 112 from the author. In addition, an attachment is attached to the email. A small icon 115 represents the attachment in the email. Typically the icon 115 also includes a file name 116. The attachment shown is a Microsoft Excel (MSExcel) spreadsheet as can be seen from the file extension ".xls" of the file name 116.

One of the deficiencies of using email as a file distribution system is that attached files can be very large. A very large attachment can severely burden many email systems as the email server creates a different email to route to each addressee. For example if the email has ten addressees and an attachment size of that is 325 k, then the email server must manage at least 3250 k (325 k* 10) of data throughput. Then the email server must distribute this 3250 k of data through the various output channels available to the server and thereby consume a large quantity of bandwidth available to the email server.

FIG. 2 shows a process of receiving an email and forwarding the email on to additional addressees. First, the email is received in block 205. The email also includes an attachment. Second, in block 210, the email is forwarded to one or more addressees. The forwarded email can also be considered a "new" email. The forwarded email also includes the attachment.

SUMMARY OF THE INVENTION

A system and method of distributing a file by email is described. In one embodiment, an email is received. The email includes an attachment. The attachment is converted to create a converted attachment. The email is then output to an addressee. The output email includes the converted attachment.

In another embodiment, the email is forwarded. The forwarded email includes an attachment identifier such as the converted attachment or a representation of the converted attachment or a representation of the original email or combinations thereof. The forwarded email is received in a server that converted the attachment. The server attaches the original, non-converted attachment to the forwarded email and outputs the forwarded email to a forward addressee.

In yet another embodiment, the converted attachment is edited in a client. The email is then forwarded. The forwarded email includes the edited, converted attachment. The edits from the edited converted attachment are then determined and the edits are applied to the original, non-converted attachment to create an edited attachment. The edited attachment is attached to the forwarded email.

BRIEF DESCRIPTION OF THE DRAWINGS

The present invention is illustrated by way of example and not limitation in the figures of the accompanying drawings in which like references indicate similar elements.

DETAILED DESCRIPTION

As will be described is more detail below, a system and method for distributing an attachment by email is described. In one embodiment, the attachment is automatically converted to reduce the file size of the attachment. In another embodiment, the attachment is converted to a predetermined format according to an addressee's preferences. In another embodiment, the original attachment is automatically attached to the email when the email is forwarded to another addressee.

Figure 1:
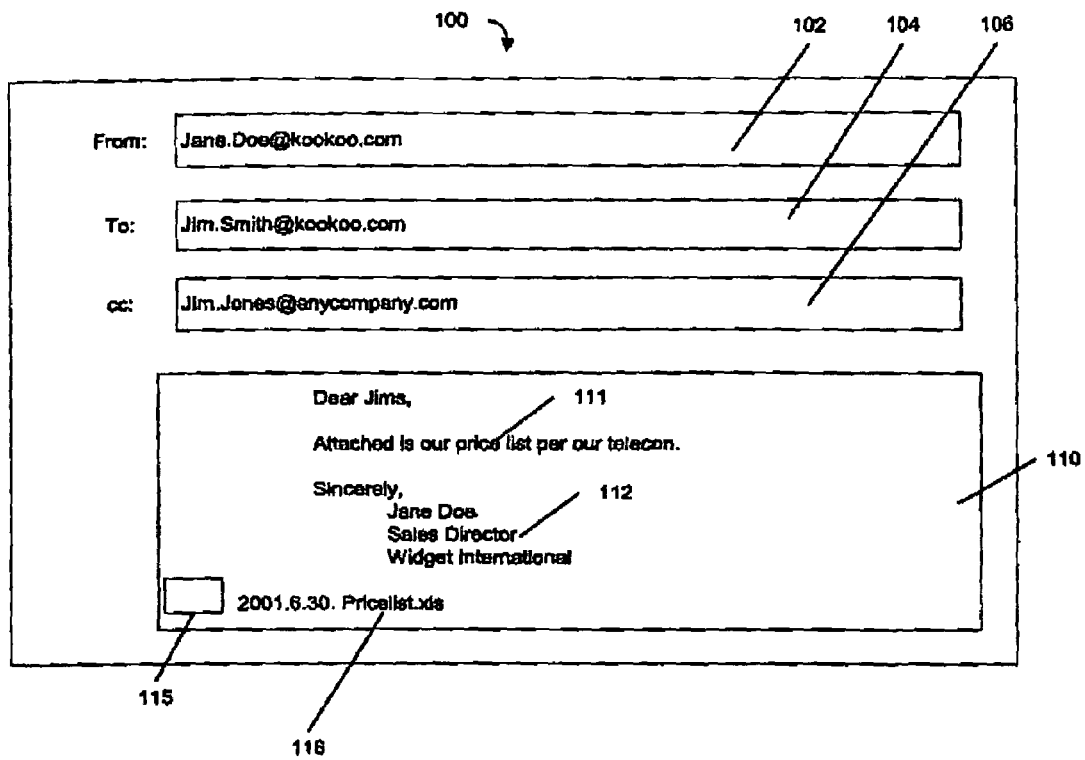
FIG. 1 illustrates a typical email.
Figure 2:
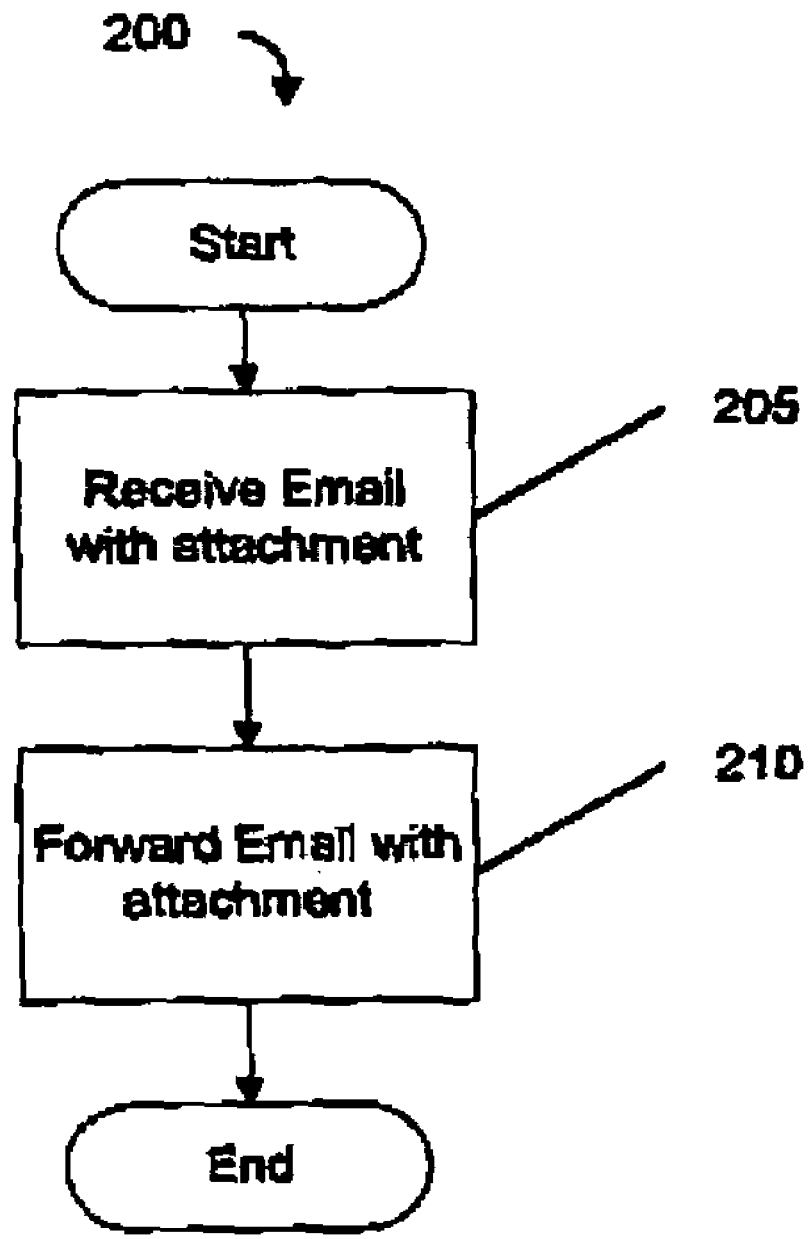
FIG. 2 shows a process of receiving an email and forwarding the email on to additional addressees.
Figure 3:
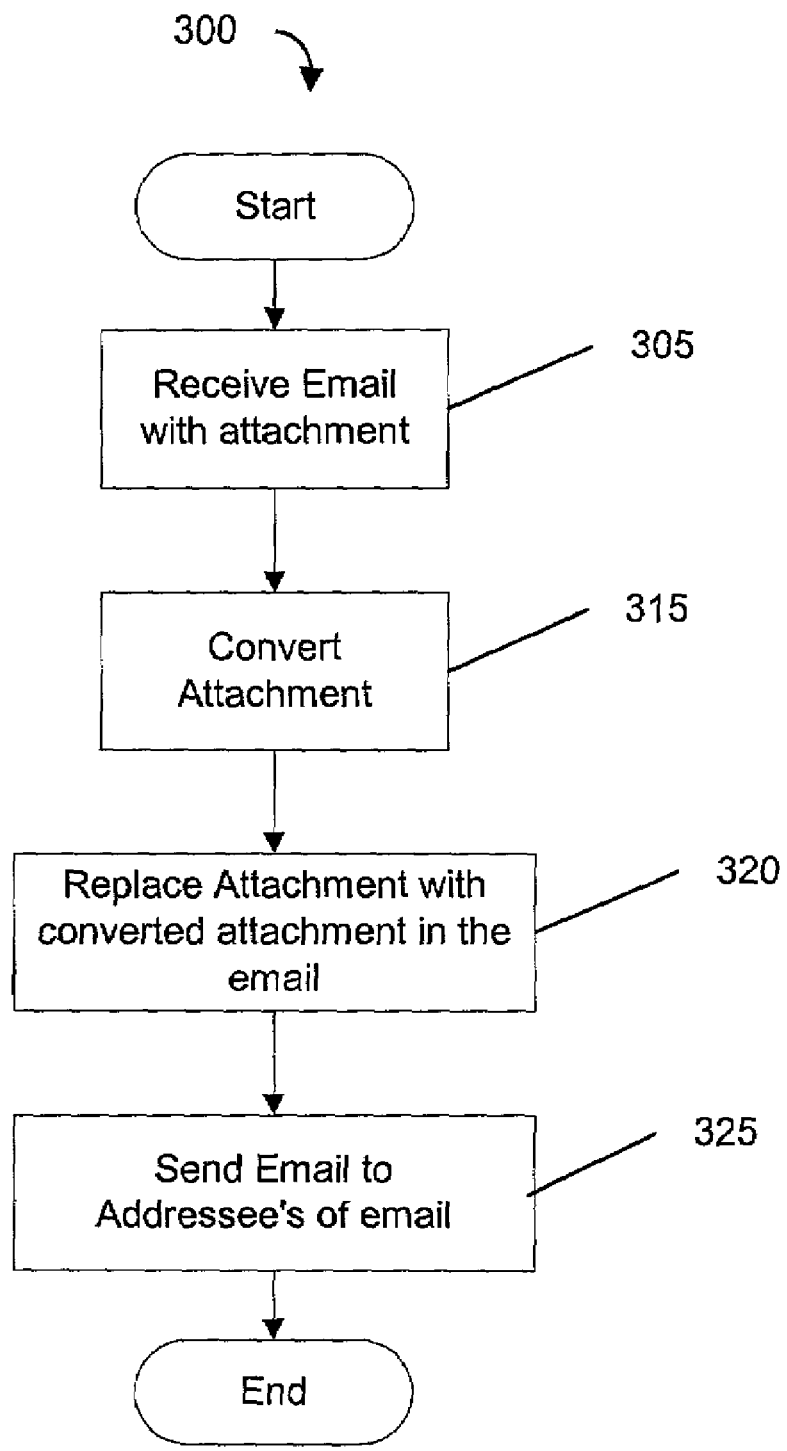
FIG. 3 shows one embodiment of a process of converting the attachment.

FIG. 3 shows one embodiment of a process of converting the attachment. First, the email is received in block 305. The email includes an attachment. Then the attachment is converted in block 315. Various embodiments of converting the attachment will be described in more detail below. In block 320, the converted attachment replaces the original attachment in the email and the email is sent onto the addressees in block 325.

In one embodiment, the attachment is detached from the email so that the attachment can be manipulated separately from the email. In another embodiment the original, unconverted attachment is stored in the server. In yet another embodiment, the converted attachment includes a representation of the attachment such as an attachment ID and the attachment ID is also recorded to correspond to the correct original, unconverted attachment and the correct converted attachment.

Figure 3A:
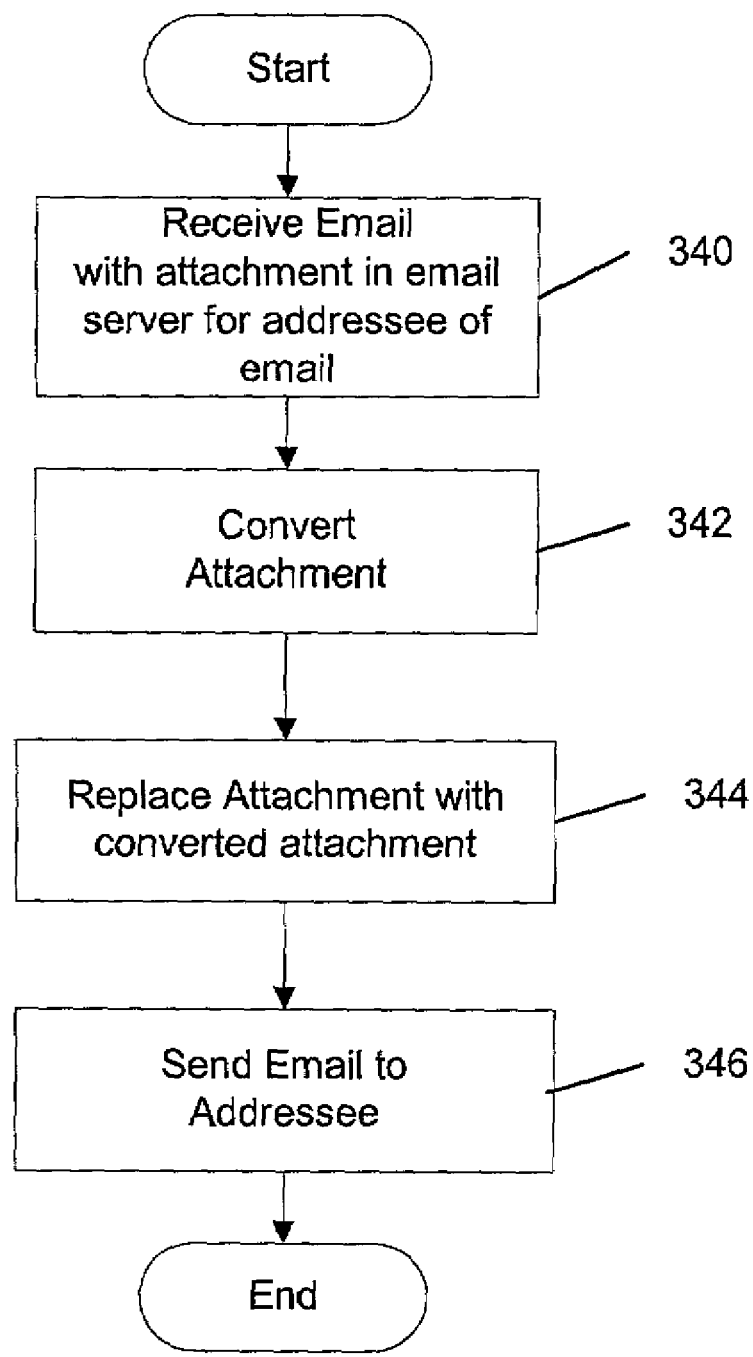
FIG. 3A shows one embodiment of a process of converting the attachment in a client-server system.

FIG. 3A shows one embodiment of a process of converting the attachment in a client-server system. First, the email is received in an email server for an addressee of the email in block 340. The email includes an attachment. The attachment is converted in block 342. In block 344, the converted attachment replaces the original attachment in the email and the email is sent onto the addressee in block 346.

In another embodiment, the email is received by a recipient (i.e. an addressee of the received email). Then the recipient forwards the email to a new addressee. Then the attachment is automatically converted and attached to the forwarded email. Then the forwarded email with converted attachment is sent on to the new addressee.

In one embodiment the attachment is converted to reduce the file size of the attachment. Converting the attachment to reduce the file size reduces the bandwidth required to distribute the email. For example, if the attachment is a Microsoft Word (MSWord).doc file format that has a size of 200 k, the file may be converted to any one or more or combinations thereof, of other file formats such as ASCII text, rich text format, HTML, XML and many other file formats. The converted attachment can be substantially smaller than the original attachment.

Another example of reducing a file size is converting a 16-bit color, high resolution JPEG (.jpg) graphic attachment to a low resolution, 4-bit gray scale graphic. Determining the correct conversion process to use to convert the attachment can include many factors. In one embodiment, the attachment is converted to a file format according to the preferences of the addressee of the email.

In another embodiment, the attachment is converted to a predetermined file format. For example, if the attachment is a proprietary file format such as a proprietary database report format, then the converting process could convert the report from the proprietary format to a more common format such as the Adobe Acrobat .pdf file type format or an HTML format. Other conversion processes can also be used so that the converted attachment is more easily useable by the addressee.

There are many attachment conversion applications that are commercially available. Proprietary or specialized conversion applications can also be used to convert the attachment to meet the requirements of the viewer of the attachment.

Figure 4:
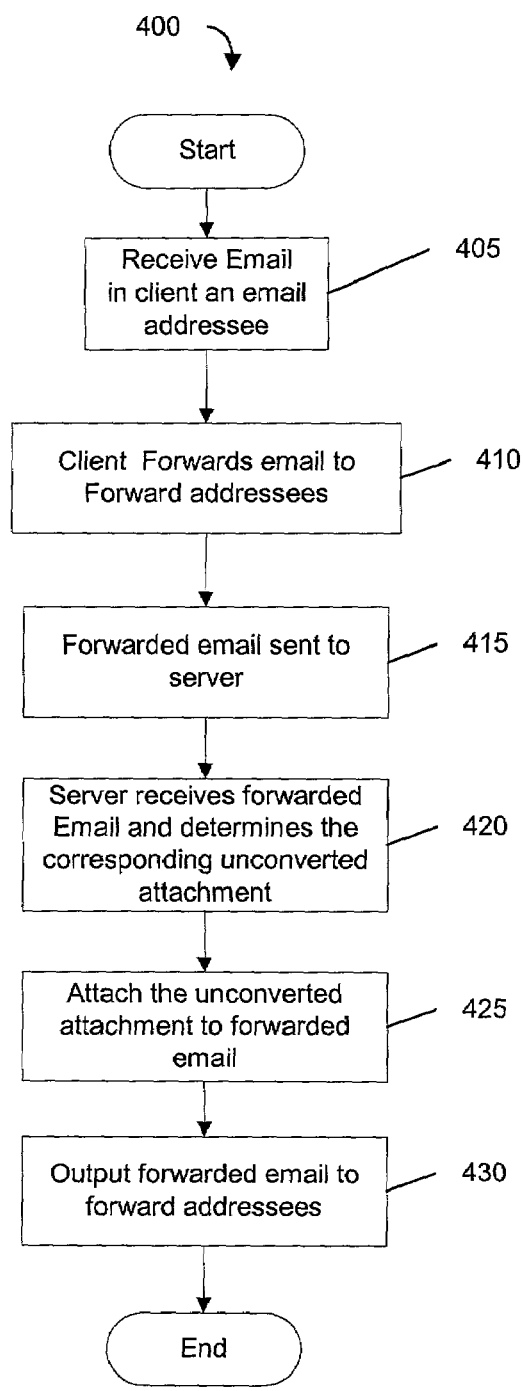
FIG. 4 shows one embodiment of a process of receiving an email with the converted attachment in an email client.

FIG. 4 shows one embodiment of a process of receiving an email with the converted attachment in an email client. An email client can include a client computer that accesses the email server for email services. The email client can also include an email client application operating on the same computer as the email server. The email is received in the email client (client) of the email addressee in block 405. The received email includes a converted attachment. In block 410, the email is forwarded from the client to one or more addressees (forward addressees). In one embodiment, the forwarded email also includes the converted attachment.

Alternatively, the forwarded email can also include a representation of the received email. A representation of the received email can include an unique email ID or other reference that identifies the received email. The forwarded email is sent to the server in block 415. The server is the same server such as the email server that converted the attachment and also stored the original, unconverted attachment as part of the conversion process. The server receives the forwarded email in block 420 and determines the correct, original, unconverted attachment from the received email. The server automatically replaces the converted attachment with the corresponding original, unconverted attachment in the forwarded email in block 425. Then the server sends the forwarded email with the original attachment to the forward addressee(s) in block 430.

In one embodiment, the server determines the correct, original, unconverted attachment by comparing the converted attachment or a representation of the converted attachment to several stored attachments. In another embodiment, the correct, original, unconverted attachment is determined by comparing the representation of the received email to the email received for the client or otherwise stored in the server.

As described above, the server converted the attachment to reduce bandwidth requirements to the client and/or according to the preferences of the email client. However, the forward addressees of the forwarded email may or may not have the same preferences or limitations of bandwidth or format. Further, the converted format is often a pared down version that includes fewer details (i.e. less formatting, lower resolution, etc) and other aspects than the original attachment. Therefore, the original attachment may be a preferable format for the forwarded email.

For example, a high resolution, color .jpg attachment is received in the server. The server converts the high resolution, color .jpg to a low-resolution, 4-bit gray-scale .jpg or other graphic format because the server knows preferences of the addressee. In this example the addressee is a wireless PDA client of the server. Because the wireless PDA has a small, low-resolution monochrome display, then the addressee does not need the high resolution color jpg. The addressee receives and views the email and attachment. The addressee then forwards the email on to a group of forward addressees. The email with the converted attachment is returned to the server. The server determines the original attachment and replaces the converted attachment with the original high-resolution, 16-bit color .jpg graphic attachment and sends the forwarded email to the forward addressees.

In one embodiment, the attachments are identified by an attachment ID in the server that performs the attachment conversion. The server stores the original attachment and the attachment ID and the converted attachment. The server can then more easily identify the original and converted attachments that are received by the server. The attachment ID can be in the file name or can be part of a file header in the converted attachment or elsewhere in the converted attachment so that the server is able to identify the converted attachment.

In one alternative embodiment of the process of FIG. 4, forwarding the email from the client to a forward addressee, the converted attachment is replaced by an attachment ID in the forwarded email. When the forwarded email is received in the server, the server identifies the original attachment by comparing the attachment ID from the forwarded email to the attachment IDs of the stored attachments. Then the attachment ID in the forwarded email is replaced by the corresponding original attachment. Then the forwarded email is sent to the forward addressee(s) specified by the email. Including only the attachment ID in the forwarded email from the client to the server can further reduce the bandwidth required to distribute an attachment by email.

Figure 5:
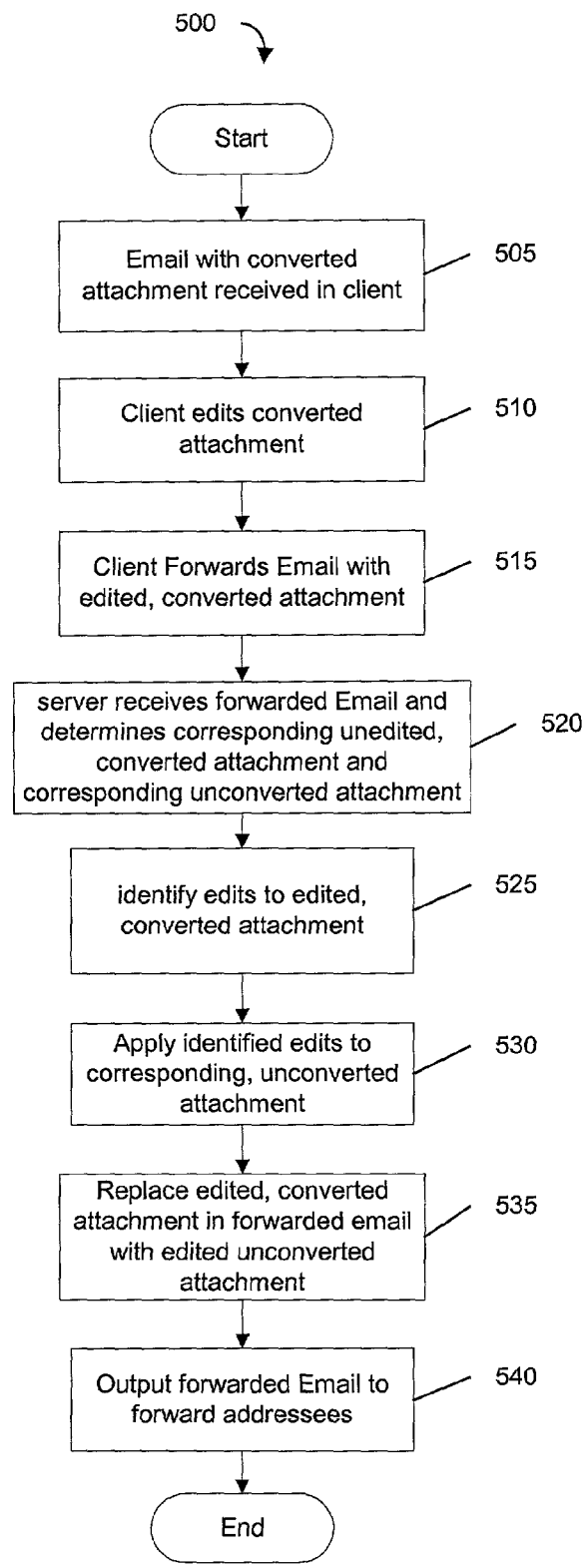
FIG. 5 illustrates one embodiment of a process where the converted attachment is edited in the email client.

FIG. 5 illustrates one embodiment of a process where the converted attachment is edited in the email client. The email with the converted attachment is received in the client in block 505. The client then views the attachment and edits the attachment in block 510. In block 515, the email is forwarded. The forwarded email includes the edited, converted attachment and one or more forward addressees. In block 520, the forwarded email is sent to the server that converted the attachment as described above. The server then as descried above, detects the edited, converted attachment and identifies the corresponding converted attachment stored in the server. The server then compares the edited, converted attachment to the original converted attachment in block 525. There are many known methods in the art of comparing two similar files to identify differences (i.e. edits in this instance). In block 530, the server automatically edits the original, unconverted attachment in accordance with the edits that were applied to the edited, converted attachment in the client. In block 535, the server replaces the converted, edited attachment in the forwarded email with the edited, unconverted attachment. In block 540, the server sends the forwarded email to the forward addressees.

As described above in FIG. 5, the server can receive an edited converted attachment and then forward a correspondingly edited original attachment. For example, if the original attachment is a MSWord document, the server converts the MSWord document to an ASCII text file. The ASCII text file then sent to the client. The client views the ASCII text file and edits the ASCII text file, (e.g. changing a sentence, or a letter, etc.). Then the client forwards the email with the edited ASCII text file to one or more forward addressees. The server receives the edited ASCII text attachment. The server determines the corresponding converted ASCII text attachment and compares the edited ASCII text attachment edited to the corresponding ASCII text attachment. The server identifies the differences/edits that were made in the client. The server then applies the identified edits to the original, unconverted MSWord document attachment to create an edited, MSWord document. The server then attaches the edited MSWord document to the forwarded email and sends the forwarded email on to the forward addressees.

The process of FIG. 5 allows a client to virtually view and edit the original format attachments without being burdened by having to actually manipulate the large original attachment. The process of FIG. 5 also allows the client to forward the client's proposed changes to other addressees.

Figure 6:
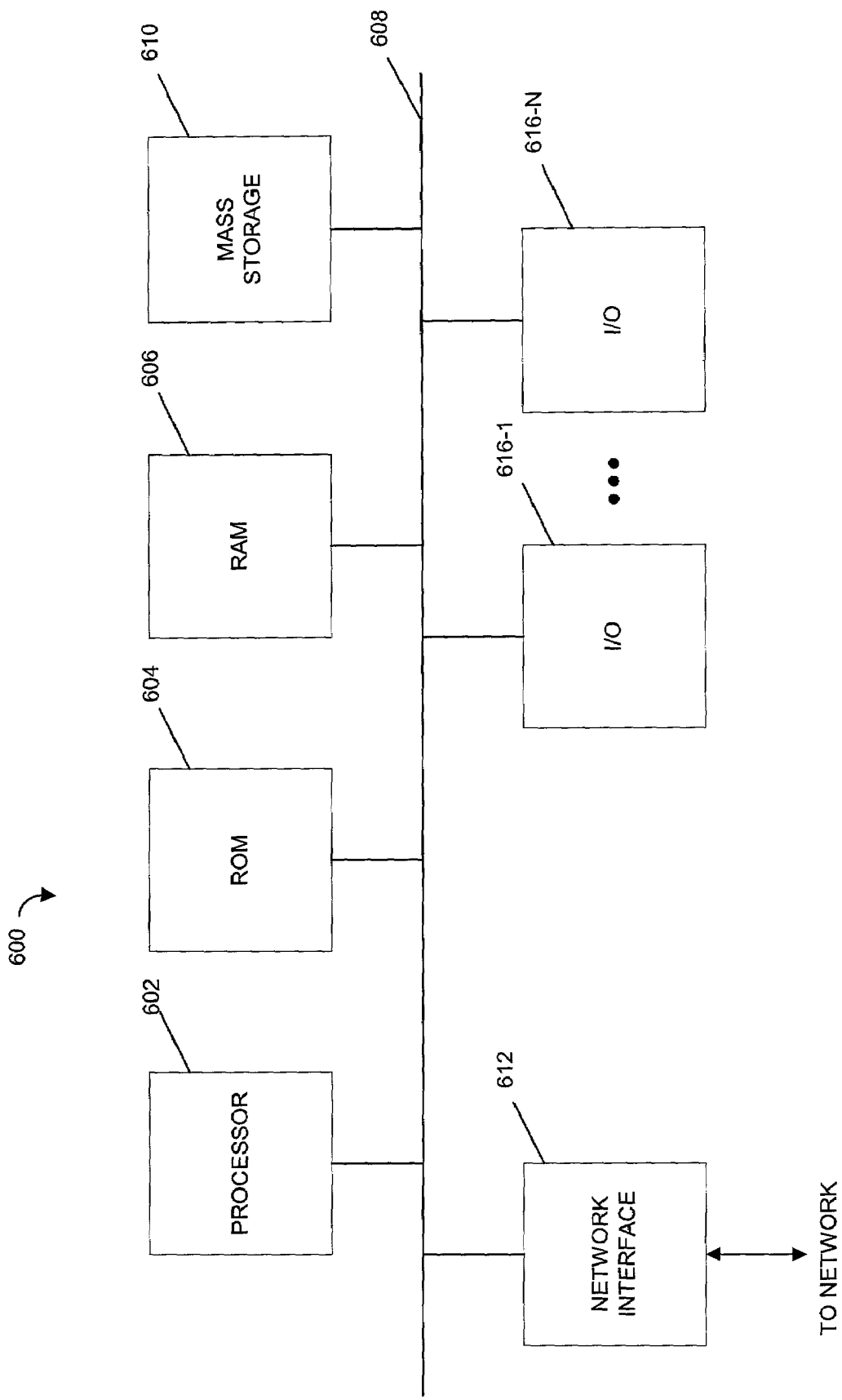
FIG. 6 shows a general computer that can be used as the client or as the server computer.
Figure 7:
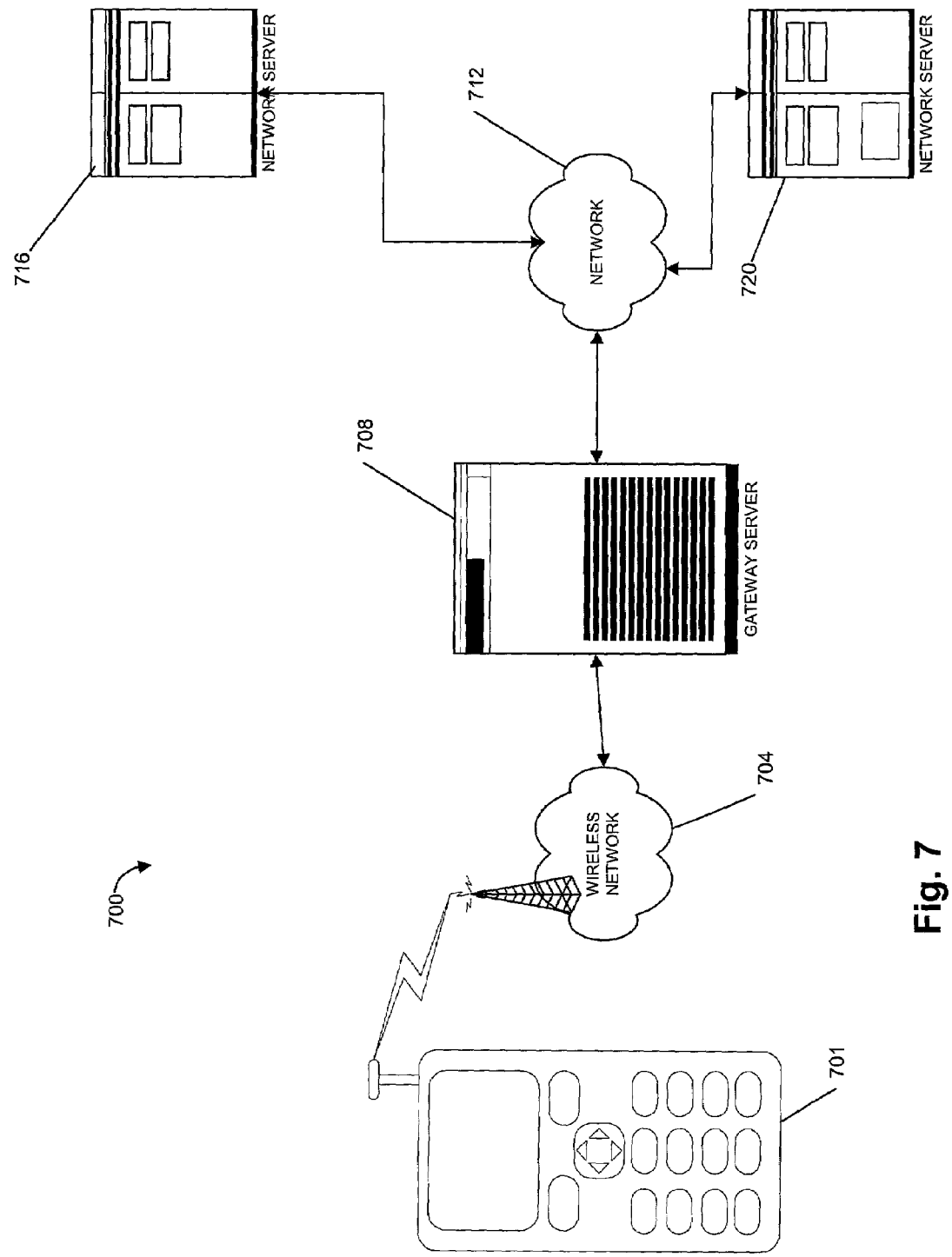
FIG. 7 describes one embodiment of a network server system.

FIG. 6 is a high-level block diagram of a computer system representative of any or all of the client 701 or the servers, i.e., network servers 716, 720 and gateway server 708, shown in FIG. 7. As shown, the computer system includes a processor 602, ROM 604, and RAM 606, each connected to a bus system 608. The bus system 608 may include one or more buses connected to each other through various bridges, controllers and/or adapters, such as are well known in the art. For example, the bus system 608 may include a "system bus" that is connected through an adapter to one or more expansion buses, such as a Peripheral Component Interconnect (PCI) bus. Also coupled to the bus system 608 are a mass storage device 610, a network interface 612, and a number (N) of input/output (I/O) devices 616-1 through 616-N.

I/O devices 616-1 through 616-N may include, for example, a keyboard, a pointing device, a display device and/or other conventional I/O devices. Mass storage device 610 may include any suitable device for storing large volumes of data, such as a magnetic disk or tape, magneto-optical (MO) storage device, or any of various types of Digital Versatile Disk (DVD) or Compact Disk (CD) based storage.

Network interface 612 provides data communication between the computer system and other computer systems such as via the networks 704, 712 of FIG. 7. Hence, network interface 612 may be any device suitable for or enabling the computer system 600 to communicate data with a remote processing system over a data communication link, such as a conventional telephone modem, an Integrated Services Digital Network (ISDN) adapter, a Digital Subscriber Line (DSL) adapter, a cable modem, a satellite transceiver, an Ethernet adapter, or the like.

Of course, many variations upon the architecture shown in FIG. 6 can be made to suit the particular needs of a given system. Thus, certain components may be added to those shown in FIG. 6 for given system, or certain components shown in FIG. 6 may be omitted from the given system.

FIG. 7 describes one embodiment of a network server system. The network server system includes a gateway server 708 that provides a gateway to a wireless network 704, and the wireless network has a wireless client 701. As shown the wireless client 701 is a cellular telephone, but other types of wireless clients such as a wireless PDA, and other devices could also be used. In addition, the gateway server is attached to a network 712, also attached to the network 712 are two network servers 716, 720. The gateway server 708 can also be part of one of the network servers 716, 720. One of the servers 708, 712, 720 is an email server for the wireless client 701. Because the bandwidth across the wireless network 704, tends to be more limited than across the wired network 712, then it is advantageous to have reduced sized the email. In addition, the wireless client 701 does not have the viewing capabilities and the processing capabilities of larger computer system such as a lap top and desk top PCs and other computing platforms. Therefore, a reduced sized and/or converted format attachment might also be required to allow that wireless client 701 to use the attachment. The wireless network 704 is typically limited to narrow bandwidths of approximately 14.4 kbps or less and sometimes slightly higher bandwidths such as like 19.2 or 28.8 kbps. The wireless network 704 is typically substantially narrower bandwidth when compared to the large bandwidth capabilities of a wired network 712. Often wired network 712 includes a 1.4 megabit of a T1 connection, the approximately 1 megabit connection of a DSL connection, a 10 megabit ethernet connection or other types of broad bandwidth (i.e. approximately 300 kbps or greater) connections that are capable in a wired network 712.

Figure 8:
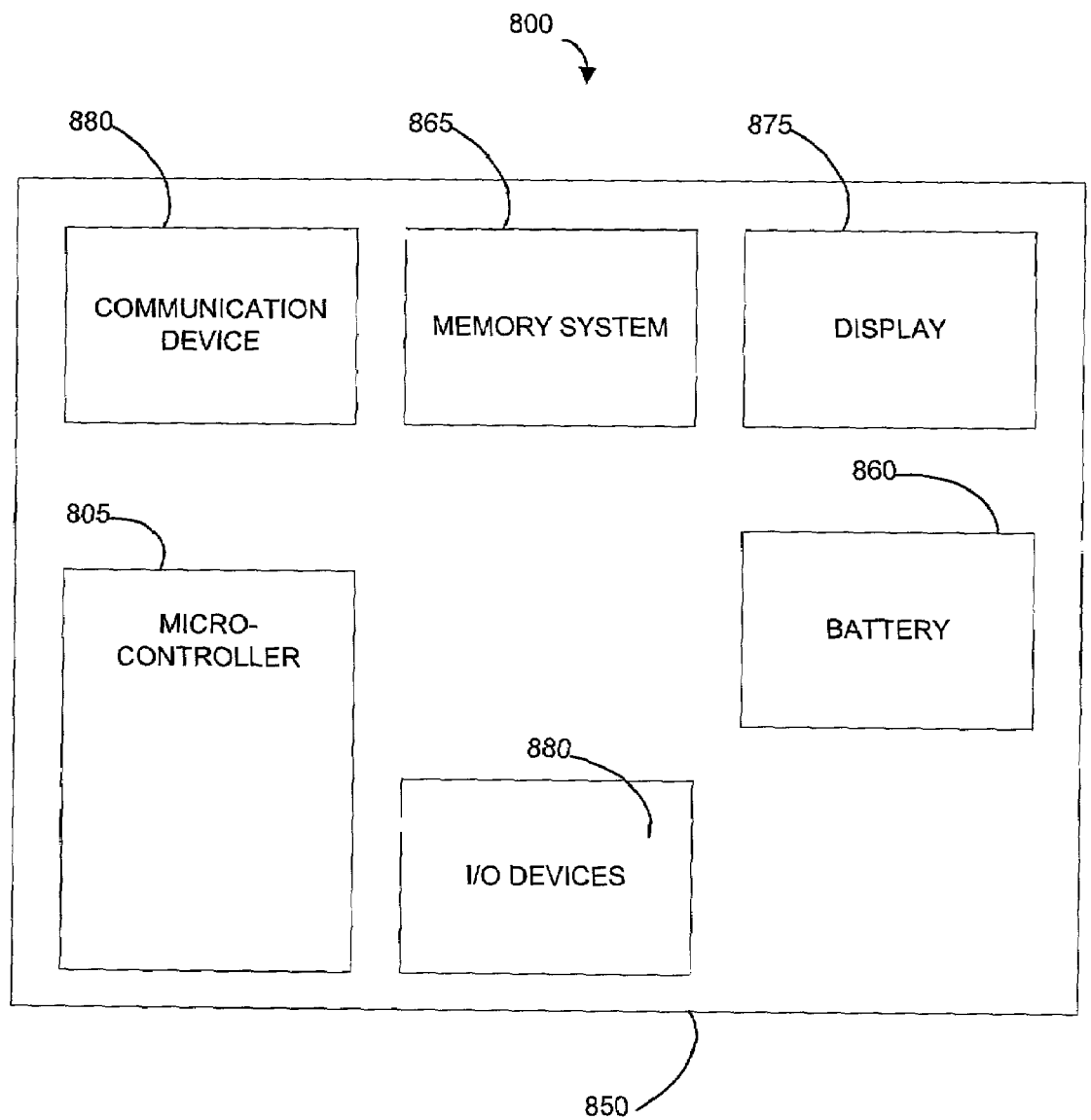
FIG. 8 illustrates one embodiment of a client computing device.

FIG. 8 illustrates one embodiment of a client computing device. The client computing device 800 includes a microcontroller 805, an external memory 865, a display 875, various I/O devices 880 such as a keyboard, and a battery 860. The external memory 865 may be used to store programs and/or portal data transmitted to the client computing device 800 from the portal server 708. In one embodiment, the external memory 865 is non-volatile memory (e.g., an electrically erasable programmable read only memory ("EE-PROM"); a programmable read only memory ("PROM"), etc). Alternatively, the memory 865 may be a volatile memory (e.g., random access memory or "RAM") but the data stored therein may be continually maintained via the battery 860. The battery 860 in one embodiment is a coin cell battery (e.g., of the same type used in portable electronic devices such as calculators and watches). In one embodiment, when the battery power decreases below a threshold level, the client computing device 850 will notify the user and/or the portal server 708. The portal server 708 in one embodiment will then automatically send the user a new battery.

The microcontroller 805 of one embodiment is comprised of a central processing unit ("CPU"), a read only memory ("ROM"), and a scratchpad RAM. The ROM is further comprised of an interpreter module and a toolbox module.

The toolbox module of the ROM contains a set of toolbox routines for processing data, text and graphics on the client computing device 800. These routines include drawing text and graphics on the client computing device's display 875, decompressing data transmitted from the portal server 708, reproducing audio on the client computing device 800, and performing various input/output and communication functions (e.g., transmitting/receiving data over the client link). A variety of additional client computing device functions may be included within the toolbox while still complying with the underlying principles of the invention.

In one embodiment, microprograms and portal data are transmitted from the portal server 708 to the external memory 865 of the client computing device via a communication interface under control of the microcontroller 805. Various communication interfaces may be employed without departing from the underlying principles of the invention including, for example, a Universal Serial Bus ("USB") interface or a serial communication ("serial") interface. The microprograms in one embodiment are comprised of compact, interpreted instructions known as "bytecodes," which are converted into native code by the interpreter module before being executed by the microcontroller 805. One of the benefits of this configuration is that when the microcontroller portion of the client computing device 800 is upgraded (e.g., to a faster and/or less expensive model), only the interpreter module and toolbox of the ROM needs to be rewritten to interpret the currently existing bytecodes for the new microcontroller 805. In addition, this configuration allows client computing devices 800 with different CPUs to coexist and execute the same microprograms. Moreover, programming frequently-used routines in the ROM toolbox module reduces the size of microprograms stored in the external memory 865, thereby conserving memory and bandwidth over the client link. In one embodiment, new interpreter modules and/or toolbox routines may be developed to execute the same microprograms on cellular phones, personal information managers ("PIMs"), or any other device with a CPU and memory.

One embodiment of the ROM may be comprised of interpreted code as well as native code written specifically for the microcontroller CPU. More particularly, some toolbox routines may be written as interpreted code (as indicated by the arrow between the toolbox and the interpreter module) to conserve memory and bandwidth for the same reasons described above with respect to microprograms. Moreover, in one embodiment, data and microprograms stored in external memory 865 may be configured to override older versions of data/microprograms stored in the ROM (e.g., in the ROM toolbox).

The client computing device 800 may communicate with the portal server 708 (discussed above) using various RF communication techniques. In one embodiment, the RF communication is established through the communication device 880. In one embodiment, the communication device 880 includes a cellular telephone module that includes a full function cellular telephone that the microcontroller 805 may access for establishing a wireless link to the portal server 708. The communication device 880 can also include any other similar RF receiver/transmitter combination that will allow the microcontroller 805 to establish a link to the portal server 708 or other network server such as network server 716,720. For example, in one particular embodiment, the client computing device 800 transmits and receives data to/from a cellular network via the cellular digital packet data ("CDPD") standard. As it is known in the art, the CDPD standard is a digital wireless standard that is deployed as an enhancement to the existing analog cellular network. It provides a packet overlay onto the AMPS network and moves data at 19.2 Kbps over continuously-changing unused intervals in standard voice channels. Accordingly, this embodiment of the client computing device is capable of exploiting normally unused bandwidth on a nation-wide, analog cellular network. Embodiments of the client computing device may also be configured to transmit/receive data using a variety of other communication standards including 2-way paging standards and third generation ("3G") wireless standards (e.g., UTMS, CDMA 2000, NTT DoCoMo, . . . etc).

As indicated in FIG. 8, one embodiment of the client computing device 800, the CPU employs a 32-bit RISC-based microprocessor such as an ARM processor. As is known in the art, ARM processors are widely used in PDAs, cell phones and a variety of other wireless devices. It should be noted, however, that various other hardware and software (and/or firmware) architectures may be used for the client computing device 800 while still complying with the underlying principles of the invention.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Figure 9:
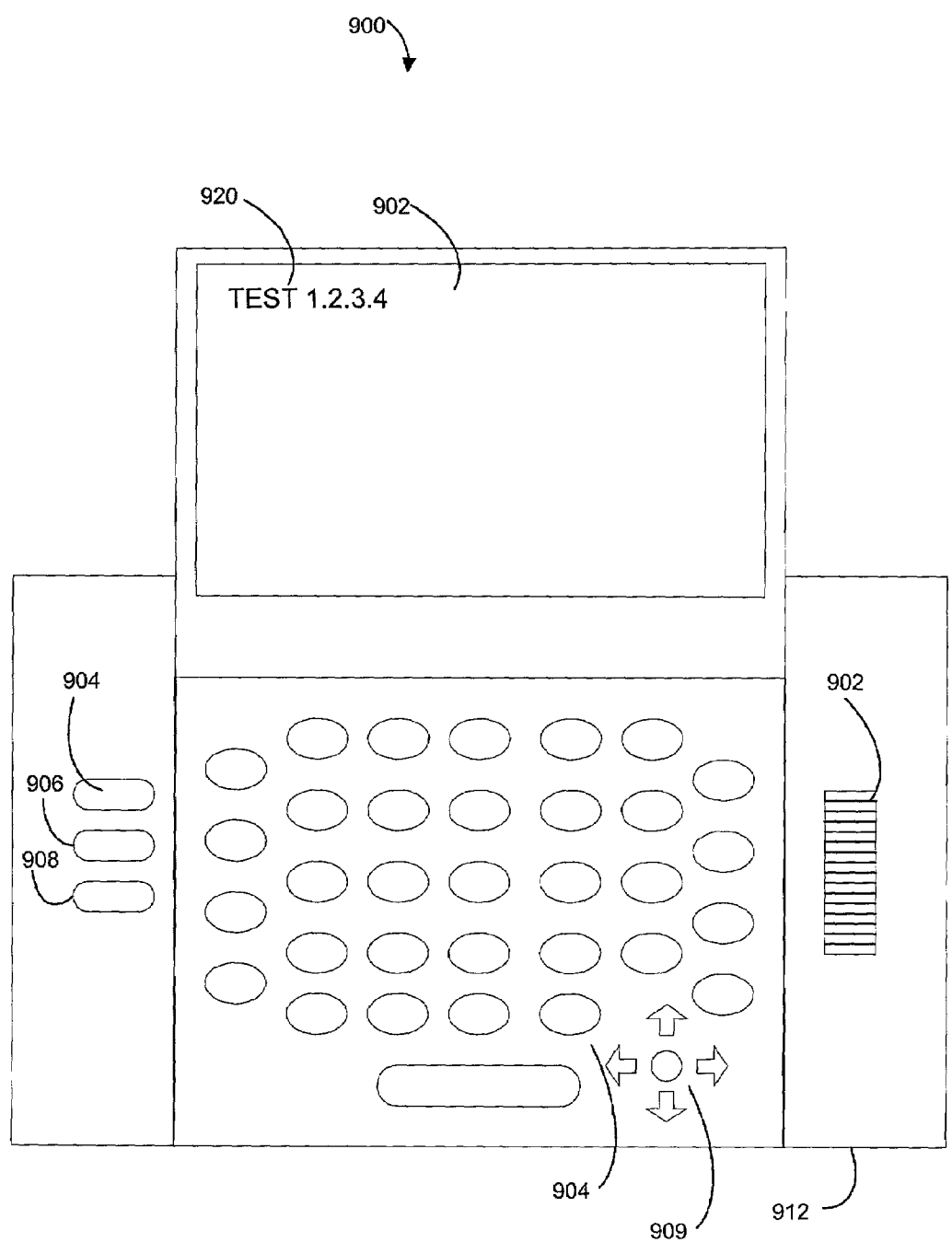
FIG. 9 illustrates an embodiment of a handheld keyboard and display device such as may be used as the client computing device of FIG. 8.

FIG. 9 illustrates an embodiment of a handheld keyboard and display device such as may be used as the client computing device of FIG. 8. The handheld keyboard and display device 900 can also include additional user interface devices such as a pointing device, selection buttons 904, 906, 908 and other user interface devices such as joysticks, mice, trackballs, or trackpoint 909.

In one embodiment, the display 902 rotates about a pivot. For example, FIG. 9 shows one embodiment of the keyboard and display device in the open position so that the keyboard 904 is accessible. When the display 902 is rotated 180 degrees about the pivot, to the closed position, the keyboard 914 is substantially covered.

In one embodiment, the display 902 is a liquid crystal display, or other similar monochrome or color display devices. The display 902 can also include a scratch resistant display surface such as glass or polycarbonate or other scratch resistant coating or outer layers as are known in the art. In one embodiment, the display also includes a removable transparent cover to protect the display screen. The transparent cover can also be a disposable cover. In one embodiment, the display 902 can also include a touch screen.

Throughout the foregoing description, for the purposes of explanation, numerous specific details were set forth in order to provide a thorough understanding of the invention. It will be apparent, however, to one skilled in the art that the invention may be practiced without some of these specific details. For example, while the system described above in FIG. 7 employs a single gateway server 708, alternative embodiments of the invention may include numerous different servers (e.g., database servers, web servers, etc), and/or mirrored servers distributed across a network. Moreover, while the embodiments described above focus on a client computing device, which executes interpreted code (e.g., Java byte codes), the principles of the invention may also be implemented on devices, which execute non-interpreted code. Accordingly, the scope and spirit of the invention should be judged in terms of the claims that follow.

One skilled in the art will immediately appreciate that the invention can be practiced with other computer system configurations, including multi-processor systems, minicomputers, mainframe computers, and the like. The invention can also be practiced in distributed computing environments where tasks are performed by remote processing devices that are linked through a communications network.

It will be further appreciated that the instructions represented by the blocks in FIGS. 3–5 are not required to be performed in the order illustrated, and that all the processing represented by the blocks may not be necessary to practice the invention In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method of distributing a file by email comprising:
   receiving a first email in a server, wherein the first email includes a first attachment;
   creating a converted attachment from the first attachment;
   storing the first attachment on the server;
   outputting the first email to an addressee, wherein the first email includes the converted attachment and further wherein the first email is received in a client comprising the addressee;
   receiving a forward email message in the server from the addressee, the forward email message containing the converted attachment and a forward addressee;
   identifying the first attachment in response to receiving the forward email message, wherein identifying the first attachment comprises using an attachment identifier to identify the first attachment from a plurality of stored attachments, wherein the attachment identifier includes the converted attachment;
   upon identifying the first attachment, attaching the first attachment to the forward email message; and
   forwarding the forward email message with the first attachment to the forward addressee.

2. The method of claim 1, wherein the server is an email server for the addressee.

3. The method of claim 1, wherein the attachment identifier includes a representation of the converted attachment.

4. The method of claim 1, wherein the attachment identifier includes a representation of the first email.

5. The method of claim 1, further comprising:
   receiving a plurality of edits in the server to the converted attachment from the addressee.

6. The method of claim 5, further comprising:
   applying the plurality of edits to the first attachment to create an edited, first attachment;
   attaching the edited, first attachment to the forward email; and
   outputting the forward email to the forward addressee.

7. The method of claim 5, wherein identifying the first attachment comprises using an attachment identifier to identify the first attachment from a plurality of stored attachments, wherein the attachment identifier includes the converted attachment with the plurality of edits.

8. The method of claim 1, wherein the converted attachment has a smaller file size than the first attachment.

9. The method of claim 1, wherein the first attachment has a first file format and wherein the converted attachment has a second file format.

10. The method of claim 1, wherein creating a converted attachment from the first attachment includes:
    determining a preference of the addressee;
    selecting one of a plurality of conversion methods, wherein the selected conversion method converts the first attachment according to the addressee's preference; and
    applying the selected conversion method to the first attachment.

11. The method of claim 1, wherein outputting the email to the addressee includes:
    replacing the first attachment with the converted attachment.

12. A method of distributing a file by email comprising:
    receiving a first email in a server, wherein the first email includes a first attachment;
    creating a converted attachment from the first attachment;
    storing the first attachment on the server;
    outputting the first email to an addressee, wherein the first email includes the converted attachment;
    receiving a plurality of edits in the server to the converted attachment from the addressee;
    determining the first attachment that corresponds to the converted attachment upon receiving the plurality of edits; and
    applying the plurality of edits to the first attachment to create an edited, first attachment;
    forwarding the first email to a forward addressee, wherein the first email includes the converted attachment with the plurality of edits and further wherein forwarding the first email comprises:

outputting the first email to the server;

attaching the edited, first attachment to the forward email; and outputting the forward email to the forward addressee.

13. A method for processing email attachments comprising:

receiving a first email message in a server, wherein the first email message includes a first attachment in a first attachment format;

creating a converted attachment in a second attachment format from the first attachment, the second attachment format interpretable by a client device;

storing the first attachment on the server;

associating an attachment identifier with the first attachment, the attachment identifier usable to uniquely identify the first attachment;

transmitting the first email message including the attachment identifier and the converted attachment in the second attachment format to a client;

receiving a second email message in the server from the client addressed to one or more email recipients, the second email message including the attachment identifier identifying the first attachment;

identifying the first attachment with the attachment identifier;

attaching the first attachment in the first attachment format to the second email message; and transmitting the second email message to the one or more email recipients with the first attachment in the first attachment format.

14. The method as in claim 13 wherein the attachment identifier comprises a unique email identifier uniquely identifying the first email message.

15. The method as in claim 13 wherein the attachment identifier comprises the converted attachment in the second attachment format.

16. The method as in claim 13 wherein the attachment identifier comprises a file name uniquely identifying the first attachment on the server.

* * * * *